United States Patent
Jiang et al.

(10) Patent No.: US 11,139,546 B2
(45) Date of Patent: Oct. 5, 2021

(54) DIELECTRIC FILTER, TRANSCEIVER DEVICE, AND BASE STATION

(71) Applicant: HUAWEI TECHNOLOGIES CO., LTD., Guangdong (CN)

(72) Inventors: Tao Jiang, Shanghai (CN); Jiyong Guo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/542,992

(22) Filed: Aug. 16, 2019

(65) Prior Publication Data

US 2019/0372189 A1   Dec. 5, 2019

Related U.S. Application Data

(63) Continuation of application No. PCT/CN2017/073789, filed on Feb. 16, 2017.

(51) Int. Cl.
| | |
|---|---|
| *H01P 1/208* | (2006.01) |
| *H01P 7/06* | (2006.01) |
| *H01P 7/10* | (2006.01) |
| *H04B 1/40* | (2015.01) |

(52) U.S. Cl.
CPC .............. *H01P 1/2084* (2013.01); *H01P 7/06* (2013.01); *H01P 7/10* (2013.01); *H04B 1/40* (2013.01)

(58) Field of Classification Search
CPC .. H01P 1/2084; H01P 7/10; H01P 7/06; H01P 1/212; H01P 1/205; H04B 1/40
USPC .......................................................... 455/73
See application file for complete search history.

(56) References Cited

U.S. PATENT DOCUMENTS

| | | |
|---|---|---|
| 4,431,977 A | 2/1984 | Sokola et al. |
| 5,926,079 A | 7/1999 | Heine et al. |
| 2002/0145491 A1* | 10/2002 | Kuroda ................. H01P 1/2056 333/202 |
| 2003/0062973 A1 | 4/2003 | Endou et al. |
| 2012/0212387 A1 | 8/2012 | Horiuchi et al. |

(Continued)

FOREIGN PATENT DOCUMENTS

| | | |
|---|---|---|
| CN | 1264187 A | 8/2000 |
| CN | 1409434 A | 4/2003 |

(Continued)

OTHER PUBLICATIONS

PCT International Search Report and Written Opinion issued in International Application No. PCT/CN2017/073,789, dated Nov. 7, 2017, 20 pages (With English Translation).

(Continued)

*Primary Examiner* — Eugene Yun
(74) *Attorney, Agent, or Firm* — Fish & Richardson P.C.

(57) ABSTRACT

Example dielectric filters, transceiver devices, and base stations are described. One example dielectric filter includes a dielectric block whose surface is covered with a metal layer. The dielectric block includes at least two resonant cavities, and is provided with a via hole. The via hole is located between two adjacent resonant cavities, and an inner wall of the via hole is covered with a metal layer. A first partition ring is disposed on the surface of the dielectric block and is surrounding at least one opening of the via hole. The dielectric block is exposed in an area enclosed by an inner edge of the first partition ring and an outer edge of the first partition ring.

21 Claims, 6 Drawing Sheets

(56) References Cited

U.S. PATENT DOCUMENTS

| | | |
|---|---|---|
| 2012/0286901 A1 | 11/2012 | Vangala |
| 2016/0094265 A1 | 3/2016 | Yuan |
| 2016/0099492 A1 | 4/2016 | Yuan et al. |
| 2018/0269555 A1 | 9/2018 | Kang et al. |

FOREIGN PATENT DOCUMENTS

| | | |
|---|---|---|
| CN | 1707851 A | 12/2005 |
| CN | 101340014 A | 1/2009 |
| CN | 102576924 A | 7/2012 |
| CN | 103618122 A | 3/2014 |
| CN | 103797639 A | 5/2014 |
| CN | 103811835 A | 5/2014 |
| CN | 104604022 A | 5/2015 |
| CN | 105244571 A | 1/2016 |
| CN | 104364962 B | 6/2019 |
| WO | 2014194477 A1 | 12/2014 |

OTHER PUBLICATIONS

Extended European Search Report issued in European Application No. 17896528.1 dated Jan. 27, 2020, 8 pages.
Office Action issued in Chinese Application No. 201780086163.8 dated Apr. 14, 2020, 13 pages (with English translation).

\* cited by examiner

DIELECTRIC FILTER, TRANSCEIVER DEVICE, AND BASE STATION

CROSS-REFERENCE TO RELATED APPLICATIONS

This application is a continuation of International Application No. PCT/CN2017/073789, filed on Feb. 16, 2017, the disclosure of which is hereby incorporated by reference in its entirety.

TECHNICAL FIELD

Embodiments of this application relate to the field of filter technologies, and in particular, to a dielectric filter, a transceiver device, and a base station.

BACKGROUND

With the development of the filter industry, a small and light filter has gradually become a trend. A product size can be significantly reduced by using a dielectric waveguide, and the dielectric waveguide has advantages such as a high Q value and a small temperature drift. Therefore, using a dielectric waveguide is a very desirable solution of filter miniaturization.

To achieve a band-pass filtering effect, a structure needs to be designed on a dielectric filter to implement high-end zero-point suppression and low-end zero-point suppression of a passband. A low-end zero-point of the passband of the filter can be generated through capacitive coupling, so as to implement low-end zero-point suppression outside the passband. However, for the dielectric filter, implementation of capacitive coupling is not as simple as that of inductive coupling, and a special design is required.

In the prior art, a manner of implementing capacitive coupling on a dielectric filter is as follows: A blind slot or a blind hole is dug in the dielectric filter, and capacitive coupling is implemented on the dielectric filter by controlling a depth of the blind slot or the blind hole. In this manner, although capacitive coupling can be implemented on the dielectric filter, the depth of the blind slot or the blind hole needs to be precisely controlled. If the depth of the blind slot or the blind hole is controlled inappropriately, inductive coupling is formed through the blind slot or the blind hole.

In the foregoing solution, specific difficulty in processing accuracy control is brought because the depth of the blind slot or the blind hole needs to be precisely controlled. Especially, for a miniaturized high-frequency component, the component has a higher precision requirement, difficulty in processing a blind slot or a blind hole is sharply increased, and even processing of a blind slot or a blind hole cannot be implemented.

SUMMARY

Embodiments of this application provide a dielectric filter, a transceiver device, and a base station, so that a structure for implementing capacitive coupling is simple and processing difficulty of a dielectric filter can be lowered.

According to a first aspect, an embodiment of this application provides a dielectric filter, including a dielectric block whose surface is covered with a metal layer, where the dielectric block includes at least two resonant cavities; the dielectric block is provided with a via hole, the via hole is located between two adjacent resonant cavities, and an inner wall of the via hole is covered with a metal layer; and a first partition ring is disposed on the surface of the dielectric block and is surrounding at least one opening of the via hole, and the dielectric block is exposed in an area enclosed by an inner edge of the first partition ring and an outer edge of the first partition ring. Capacitive coupling between resonant cavities is implemented through a combined structure of the via hole and a conductive partition layer (that is, the first partition ring). Difficulty in processing the via hole and the first partition ring on the dielectric block is lower than difficulty in processing a blind slot or a blind hole with a specified depth on the dielectric block. It can be learned that a requirement of the dielectric filter in this embodiment of this application for a processing technique is lowered and a problem of precision control during blind slot or blind hole processing is avoided. Especially, for a miniaturized high-frequency filter with a relatively high precision requirement, it can also achieve relatively high processing precision.

In a possible design, the dielectric block is provided with at least one slot, the dielectric block is divided into at least three resonant cavities by the at least one slot, and an inner surface of each slot is covered with the metal layer. The dielectric block is divided into the at least three resonant cavities by the at least one slot. The slot is implemented simply, has low processing difficulty, and the at least three resonant cavities are formed through the at least one slot, thereby facilitating application in an actual filtering scenario.

In a possible design, the inner edge of the first partition ring and an edge of an opening of the via hole are disposed at intervals. Capacitive coupling strength of the dielectric filter may be adjusted by adjusting the interval between the inner edge of the first partition ring and the edge of the opening of the via hole, so as to adjust a low-end zero-point position of the dielectric filter.

In a possible design, a center line of the first partition ring coincides with an axis of the via hole. That the center line of the first partition ring coincides with the axis of the via hole meets an engineering design requirement, and further can make the dielectric filter present a beautiful structure.

In a possible design, the first partition ring is disposed on each of two opening sides of the via hole. That the first partition ring is disposed on each of the two opening sides of the via hole can cause an increase in capacitive coupling strength of the dielectric filter.

In a possible design, the via hole is a circular via hole. Designing the via hole into a circle can further reduce processing difficulty of the dielectric filter.

In a possible design, the via hole is a polygonal via hole. Optionally, the polygonal via hole may be various possible polygonal via holes such as a triangular via hole, a rectangular via hole, a pentagonal via hole, and a hexagonal via hole.

In a possible design, the dielectric block is further provided with a second partition ring, the dielectric block is exposed between an inner edge and an outer edge of the second partition ring, and the metal layer in an area enclosed by the inner edge of the second partition ring serves as a signal input end or a signal output end. The metal layer in the area enclosed by the inner edge of the second partition ring serves as the signal input end or the signal output end, with no need to further design an extra port on the dielectric filter as the signal input end or the signal output end. In this case, the signal input end or the signal output end can be implemented simply and ingeniously.

According to a second aspect, an embodiment of this application provides a transceiver device, including the foregoing dielectric filter.

According to a third aspect, an embodiment of this application provides a base station, including the foregoing transceiver device.

According to the dielectric filter, the transceiver device, and the base station in the embodiments of this application, capacitive coupling between resonant cavities is implemented through the combined structure of the via hole and the conductive partition layer. The structure for implementing capacitive coupling in the dielectric filter is simple and processing difficulty is lowered, so as to overcome a technical problem in the prior art that it is hard to precisely control a depth of a blind slot or a blind hole.

Reference signs: 1—first resonant cavity; 2—second resonant cavity; 3—third resonant cavity; 4—first slot; 5—second slot; 6—via hole; 7—first partition ring; 7a—outer edge of the first partition ring; 7b—inner edge of the first partition ring; 8—fourth resonant cavity; 9—second partition ring; 10—fifth resonant cavity; 11—sixth resonant cavity; 12—microstrip feeder; 21—antenna; 22—dielectric filter; 23—switch; 24—signal transmitting branch; 25—signal receiving branch; 241—power amplifier; and 251—low noise amplifier.

DESCRIPTION OF EMBODIMENTS

Figure 1:
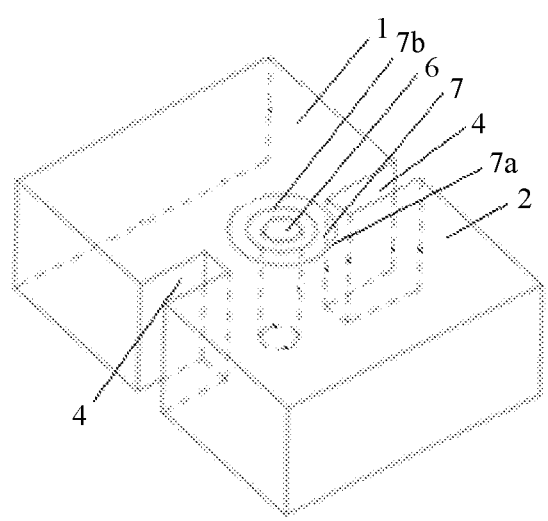
FIG. 1 is a schematic structural diagram of a dielectric filter according to an embodiment of this application.

FIG. 1 is a schematic structural diagram of a dielectric filter according to an embodiment of this application. As shown in FIG. 1, the dielectric filter includes a dielectric block whose surface is covered with a metal layer, and the dielectric block is made of a solid dielectric material. In FIG. 1, the metal layer covering the surface of the dielectric block is not identified. For a structure shown in FIG. 1, except a particularly specified part, each surface of the structure shown in FIG. 1 is covered with the metal layer.

The dielectric block shown in FIG. 1 includes at least two resonant cavities. As shown in FIG. 1, the dielectric block may be provided with a slot, and the dielectric block is divided into the at least two resonant cavities through the slot. It should be noted that an inner surface of each slot is also covered with the metal layer. For example, in FIG. 1, the dielectric block is divided through two first slots 4 into two resonant cavities: a first resonant cavity 1 and a second resonant cavity 2. The first resonant cavity 1 and the second resonant cavity 2 each are equivalent to a parallel circuit formed by an inductor and a capacitor.

To form capacitive coupling in the dielectric filter shown in FIG. 1, a via hole 6 is further disposed in the dielectric block shown in FIG. 1, and the via hole 6 is located between two adjacent resonant cavities. As shown in FIG. 1, the via hole 6 is disposed between the first resonant cavity 1 and the second resonant cavity 2, and an inner wall of the via hole 6 is covered with a metal layer. Further, a first partition ring 7 is disposed on the surface of the dielectric block and is surrounding at least one opening of the via hole 6, and the dielectric block is exposed in an area enclosed by an inner edge 7b of the first partition ring and an outer edge 7a of the first partition ring. Optionally, a center line of the first partition ring 7 coincides with an axis of the via hole 6.

Figure 2:
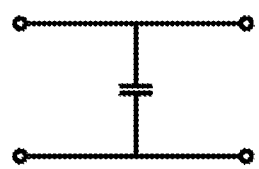
FIG. 2 is a schematic diagram of an equivalent coupling element of two resonant cavities distributed on two sides of a via hole according to an embodiment of this application.

In the solution of this embodiment of this application, structural discontinuity is generated because the dielectric filter is provided with a combined structure of the first partition ring 7 and the via hole 6, so that an electric field near the via hole 6 and the first partition ring 7 is more concentrated and electric energy can be stored. As shown in FIG. 2, the combined structure of the first partition ring 7 and the via hole 6 is equivalent to a capacitor that stores electric energy.

In addition, although structural discontinuity is also generated when the dielectric filter is not provided with the combined structure of the first partition ring 7 and the via hole 6, near the via hole 6, magnetic energy dominates, and an inductance characteristic is presented.

In the solution of this embodiment of this application, the inner edge of the first partition ring 7 may coincide with an edge of an opening of the via hole 6. Optionally, the inner edge of the first partition ring 7 and the edge of the opening of the via hole 6 are disposed at intervals. Capacitive coupling strength of the dielectric filter may be adjusted by adjusting the interval between the inner edge of the first partition ring 7 and the edge of the opening of the via hole 6, so as to adjust a low-end zero-point position of the dielectric filter.

In addition, a shape of the via hole 6 of the dielectric filter in this embodiment of this application may be designed based on an actual requirement. For example, the via hole 6 may be designed to be a circular via hole 6 or a polygonal via hole. When the via hole 6 is designed to be the circular via hole, a processing operation is easier. When the via hole 6 is designed to be the polygonal via hole, the polygonal via hole may be, for example, various possible polygonal via holes such as a triangular via hole, a rectangular via hole, a pentagonal via hole, and a hexagonal via hole.

Further, in the dielectric filter shown in FIG. 1, the shape of the via hole 6 may be the same as or different from a shape of the first partition ring 7. For example, the via hole 6 is a circular via hole, and the first partition ring 7 is a square ring or a partition ring of an irregular shape. A specific shape and size of the partition ring may be adjusted based on a performance requirement of the dielectric filter, and this is not specifically limited.

In the dielectric filter shown in FIG. 1, the first partition ring 7 is disposed on an opening side of the via hole 6. In an optional embodiment, the first partition ring 7 may be disposed on each of two opening sides of the via hole 6.

Further, the dielectric filter in this embodiment of this application may be applied to a transceiver device, for example, may be applied to a base station. To be connected to a circuit structure of the transceiver device, the dielectric filter shown in FIG. 1 is further provided with a signal input end and a signal output end.

For example, in the dielectric filter shown in FIG. 1, the signal input end is disposed on the first resonant cavity 1, and the signal output end is disposed on the second resonant cavity 2.

Figure 3:
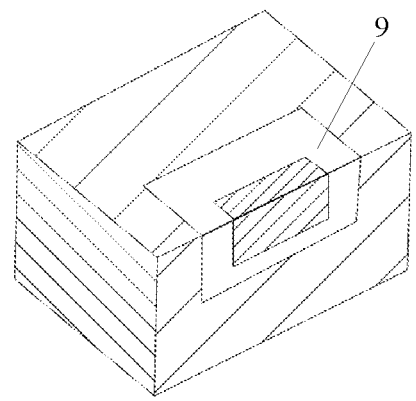
FIG. 3 is a schematic diagram of a signal input end of a dielectric filter according to an embodiment of this application.

FIG. 3 is a schematic structural diagram of the signal input end disposed on the first resonant cavity 1. Using a structure shown in FIG. 3 as an example, a structure of the signal input end is as follows: A second partition ring 9 is disposed on the first resonant cavity 1, the dielectric block is exposed between an inner edge and an outer edge of the second partition ring 9, and the metal layer in an area enclosed by the inner edge of the second partition ring 9 serves as the signal input end.

In the solution of this embodiment of this application, a structure of the signal output end may be the same as the structure of the signal input end, and details are as follows:

A third partition ring is disposed on the second resonant cavity 2, the dielectric block is exposed between an inner edge and an outer edge of the third partition ring, and the metal layer in an area enclosed by the inner edge of the third partition ring serves as the signal output end.

Figure 4:
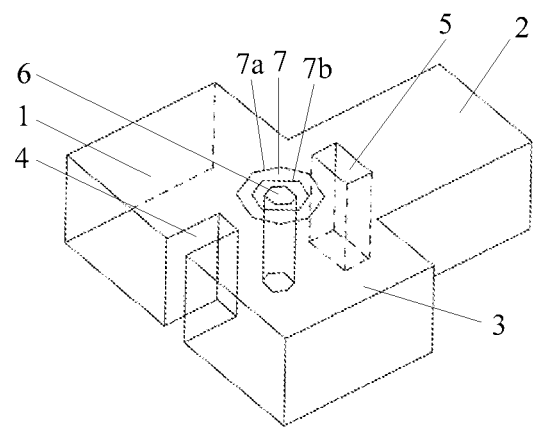
FIG. 4 is a schematic structural diagram of another dielectric filter according to an embodiment of this application.

FIG. 4 is a schematic structural diagram of another dielectric filter according to an embodiment. As shown in FIG. 4, the dielectric filter includes a dielectric block whose surface is covered with a metal layer, and the dielectric block is made of a solid dielectric material. In FIG. 4, the metal layer covering the surface of the dielectric block is not identified. For a structure shown in FIG. 4, except a particularly specified part, each surface of the structure shown in FIG. 4 is covered with the metal layer.

As shown in FIG. 4, the dielectric block is provided with a first slot 4 and a second slot 5, and inner surfaces of the first slot 4 and the second slot 5 are also covered with the metal layer. The dielectric block is divided into three resonant cavities through the first slot 4 and the second slot 5. Specifically, the first slot 4 is used to separate a first resonant cavity 1 from a third resonant cavity 3, the second slot 5 is used to separate the first resonant cavity 1 from a second resonant cavity 2, and the second slot 5 is further used to separate the second resonant cavity 2 from the third resonant cavity 3.

In the dielectric filter shown in FIG. 4, each resonant cavity is equivalent to a parallel circuit formed by an inductor and a capacitor. A narrow channel between two adjacent resonant cavities is an open window between the resonant cavities, and coupling between the two adjacent resonant cavities that is formed based on the open window is inductive coupling.

Figure 5:
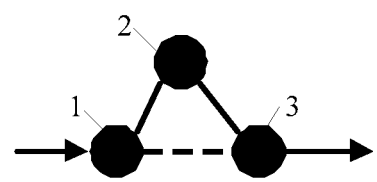
FIG. 5 is an equivalent schematic diagram of the dielectric filter shown in FIG. 4.

When a signal is input from the first resonant cavity 1 of the dielectric filter shown in FIG. 4 and output from the third resonant cavity 3 of the dielectric filter, two signal paths are formed on the dielectric filter shown in FIG. 4, as shown in FIG. 5, including the following:

a first path (marked by using a solid line): a signal path subsequently passing through the first resonant cavity 1, the second resonant cavity 2, and the third resonant cavity 3; and a second path (marked by using a dashed line): a signal path subsequently passing through the first resonant cavity 1 and the third resonant cavity 3.

The first path is a primary coupling path of the dielectric filter, and inductive coupling is formed between adjacent resonant cavities based on an open window structure. When coupling between the first resonant cavity 1 and the third resonant cavity 3 in the second path is inductive coupling, after the input signal passes from the first resonant cavity 1 to the third resonant cavity 3, phases of two path signals are the same, and no zero-point is generated due to in-phase signal superposition. When coupling between the first resonant cavity 1 and the third resonant cavity 3 in the second path is capacitive coupling, after the input signal passes from the first resonant cavity 1 to the third resonant cavity 3, phases of two path signals are opposite to each other, the two path signals cancel each other, and a zero-point can be generated.

To form capacitive coupling between the first resonant cavity 1 and the third resonant cavity 3 in the second path, as shown in FIG. 4, a via hole 6 is disposed between the first resonant cavity 1 and the third resonant cavity 3, an inner wall of the via hole 6 is covered with a metal layer, a first partition ring 7 is disposed on a surface of the dielectric block and is surrounding at least one opening of the via hole, and the dielectric block is exposed in an area enclosed by an inner edge 7b of the first partition ring and an outer edge 7a of the first partition ring. Optionally, the inner edge 7b of the first partition ring and an edge of an opening of the via hole 6 are disposed at intervals. Optionally, a center line of the first partition ring 7 coincides with an axis of the via hole 6.

Structural discontinuity is generated because the dielectric filter is provided with a combined structure of the first partition ring 7 and the via hole 6, so that an electric field near the via hole 6 and the first partition ring 7 is more concentrated and electric energy can be stored. In this case, the combined structure of the first partition ring 7 and the via hole 6 is equivalent to a capacitor that stores electric energy.

Figure 6:
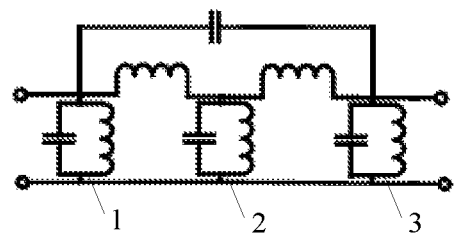
FIG. 6 is an equivalent circuit diagram of the dielectric filter shown in FIG. 4.

As shown in FIG. 6, an equivalent circuit of the dielectric filter shown in FIG. 4 has the following characteristic: Inductive coupling is formed between the first resonant cavity 1, the second resonant cavity 2, and the third resonant cavity 3 in the first path; and capacitive coupling is formed between the first resonant cavity 1 and the third resonant cavity 3 in the second path.

Because phases of two path signals are opposite to each other, and the two path signals cancel each other, low-end zero-point suppression of a passband can be generated.

Figure 7:
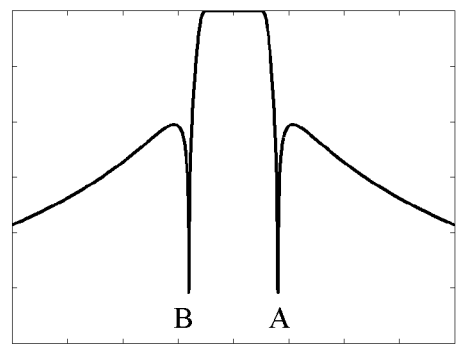
FIG. 7 is a schematic diagram of a passband of a dielectric filter according to an embodiment of this application.

As shown in FIG. 7, the dielectric filter shown in FIG. 4 forms a high-end zero-point A of a passband of the filter through inductive coupling and forms a low-end zero-point B of the passband through capacitive coupling.

Figure 8:
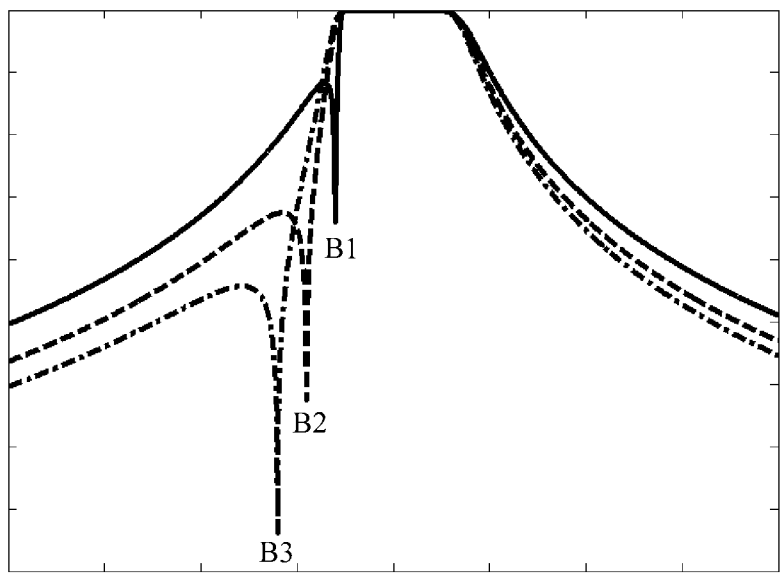
FIG. 8 is a schematic diagram of a low-end zero-point adjustment curve of a dielectric filter according to an embodiment of this application.

As shown in FIG. 8, capacitive coupling strength can be adjusted by adjusting a diameter of the via hole 6 and a width of the first partition ring 7, so as to adjust a low-end zero-point position of a passband of the dielectric filter. When the diameter of the via hole 6 increases, and/or when the width of the first partition ring 7 increases, an equivalent capacitance value increases, capacitive coupling strength increases correspondingly, and the zero-point position changes correspondingly. As shown in FIG. 8, a point B1 is a low-end zero-point position in which capacitive coupling strength is relatively high, and B3 is a low-end zero-point position in which capacitive coupling strength is relatively low. Capacitive coupling strength between two resonant cavities that is corresponding to a low-end zero-point position B2 is higher than the capacitive coupling strength between two resonant cavities that is corresponding to the point B3, and is lower than the capacitive coupling strength between two resonant cavities that is corresponding to the point B1.

Therefore, it can be learned that, in the dielectric filter provided in this embodiment of this application, capacitive coupling strength may be adjusted by adjusting the diameter of the via hole 6 and the width of the first partition ring 7. Therefore, it is relatively easy to implement strong coupling between resonant cavities.

In addition, a shape of the via hole 6 of the dielectric filter in this embodiment of this application may be designed based on an actual requirement. For example, the via hole 6 may be designed to be a circular via hole 6 or a polygonal via hole 6. When the via hole 6 is designed to be the circular via hole 6, a processing operation is easier. When the via hole 6 is designed to be the polygonal via hole 6, the polygonal via hole 6 may be, for example, various possible polygonal via holes 6 such as a triangular via hole 6, a rectangular via hole 6, a pentagonal via hole 6, and a hexagonal via hole 6.

Further, in the dielectric filter shown in FIG. 4, the shape of the via hole 6 may be the same as or different from a shape of the first partition ring 7. For example, the via hole 6 is a circular via hole, and the first partition ring 7 is a square ring or a partition ring of an irregular shape. A specific shape and size of the first partition ring 7 may be adjusted based on a performance requirement of the dielectric filter, and this is not specifically limited.

In the dielectric filter shown in FIG. 4, the first partition ring 7 is disposed on an opening side of the via hole 6. In an optional embodiment, the first partition ring 7 may be disposed on each of two opening sides of the via hole 6.

Further, the dielectric filter in this embodiment of this application may be applied to a transceiver device, for example, may be applied to a base station. To be connected to a circuit structure of the transceiver device, the dielectric filter shown in FIG. 4 is further provided with a signal input end and a signal output end.

For example, in the dielectric filter shown in FIG. 4, the signal input end is disposed on the first resonant cavity 1, and the signal output end is disposed on the third resonant cavity 3. A manner in which the signal input end and the signal output end are disposed on the dielectric filter is the same as that in FIG. 3, and details are not described herein again.

Figure 9:
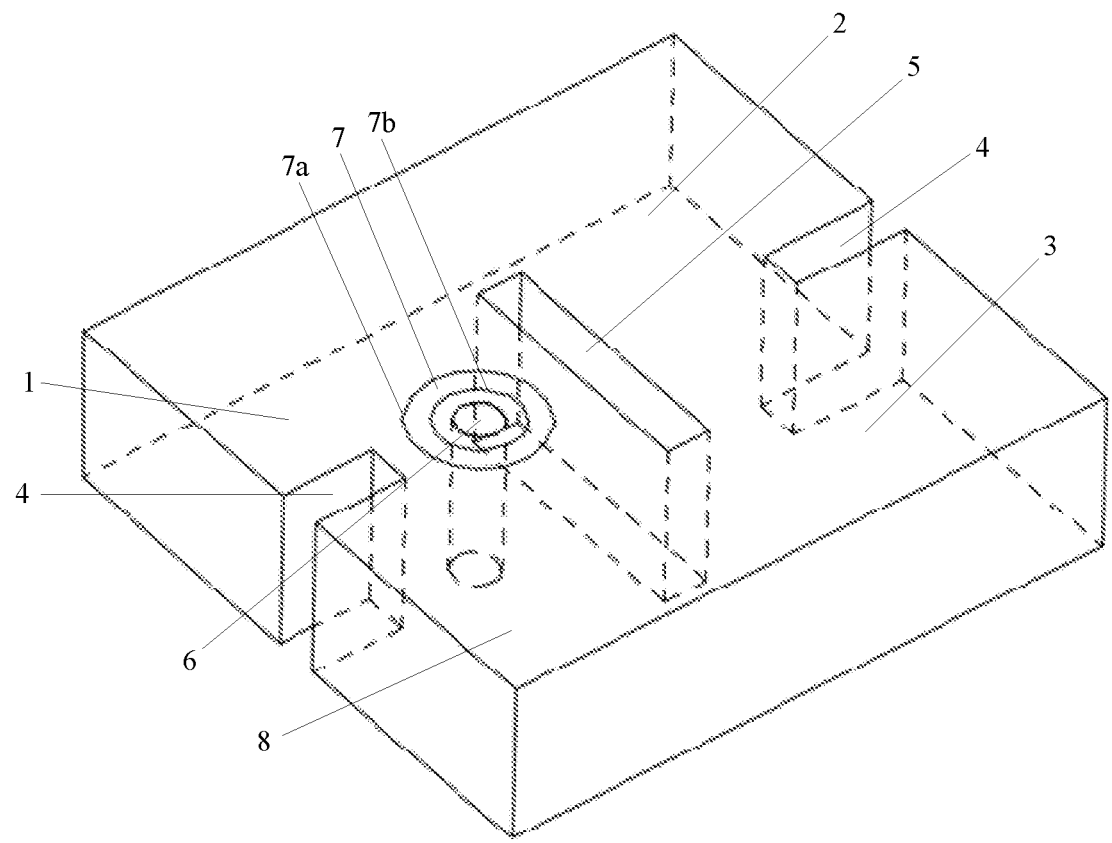
FIG. 9 is a schematic structural diagram of still another dielectric filter according to an embodiment of this application.

FIG. 9 is a schematic structural diagram of still another dielectric filter according to an embodiment of this application. As shown in FIG. 9, the dielectric filter includes a dielectric block whose surface is covered with a metal layer, and the dielectric block is made of a solid dielectric material. In FIG. 9, the metal layer covering the surface of the dielectric block is not identified. For a structure shown in FIG. 9, except a particularly specified part, each surface of the structure shown in FIG. 9 is covered with the metal layer.

As shown in FIG. 9, the dielectric block is provided with two first slots 4 and one second slot 5, and inner surfaces of the two first slots 4 and the second slot 5 are covered with the metal layer. The dielectric block is divided into four resonant cavities through the two first slots 4 and the second slot 5. Specifically, one first slot is used to separate a first resonant cavity 1 from a fourth resonant cavity 8, the other first slot is used to separate a second resonant cavity 2 from a third resonant cavity 3, and the second slot 5 is used to separate the first resonant cavity 1 from the second resonant cavity 2 and further separate the third resonant cavity 3 from the fourth resonant cavity 8.

In the dielectric filter shown in FIG. 9, each resonant cavity is equivalent to a parallel circuit formed by an inductor and a capacitor. A narrow channel between two adjacent resonant cavities is an open window between the resonant cavities, and coupling between the two adjacent resonant cavities that is formed based on the open window is inductive coupling.

Figure 10:
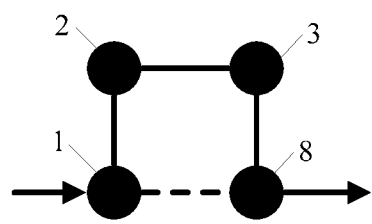
FIG. 10 is an equivalent schematic diagram of the dielectric filter shown in FIG. 9.

When a signal is input from the first resonant cavity 1 of the dielectric filter shown in FIG. 9 and output from the fourth resonant cavity 8 of the dielectric filter, two signal paths are formed on the dielectric filter shown in FIG. 9, as shown in FIG. 10, including the following:

a first path (marked by using a solid line): a signal path subsequently passing through the first resonant cavity 1, the second resonant cavity 2, the third resonant cavity 3, and the fourth resonant cavity 8; and a second path (marked by using a dashed line): a signal path subsequently passing through the first resonant cavity 1 and the fourth resonant cavity 8.

In the first path, inductive coupling is formed between adjacent resonant cavities based on an open window structure. When coupling between the first resonant cavity 1 and the fourth resonant cavity 8 in the second path is inductive coupling, after the input signal passes from the first resonant cavity 1 to the fourth resonant cavity 8, phases of two path signals are the same, and no zero-point is generated due to in-phase signal superposition. When coupling between the first resonant cavity 1 and the fourth resonant cavity 8 in the second path is capacitive coupling, after the input signal passes from the first resonant cavity 1 to the fourth resonant cavity 8, phases of two path signals are opposite to each other, the two path signals cancel each other, and a zero-point can be generated.

To form capacitive coupling between the first resonant cavity 1 and the fourth resonant cavity 8 in the second path, as shown in FIG. 9, a via hole 6 is disposed between the first resonant cavity 1 and the fourth resonant cavity 8, an inner wall of the via hole 6 is covered with a metal layer, a first partition ring 7 is disposed on a surface of the dielectric block and is surrounding at least one opening of the via hole 6, and the dielectric block is exposed in an area enclosed by an inner edge 7b of the first partition ring and an outer edge 7a of the first partition ring. Optionally, the inner edge 7b of the first partition ring and an edge of the corresponding via hole 6 are disposed at intervals.

In the solution of this embodiment of this application, capacitive coupling is formed between the first resonant cavity 1 and the fourth resonant cavity 8 through a combined structure of the via hole 6 and the partition ring. An equivalent circuit is a capacitor element.

Figure 11:
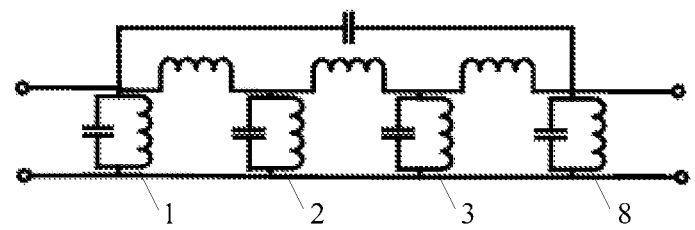
FIG. 11 is an equivalent circuit diagram of the dielectric filter shown in FIG. 9.

As shown in FIG. 11, an equivalent circuit of the dielectric filter shown in FIG. 9 has the following characteristic: Inductive coupling is formed between the first resonant cavity 1, the second resonant cavity 2, the third resonant cavity 3, and the fourth resonant cavity 8 in the first path; and capacitive coupling is formed between the first resonant cavity 1 and the fourth resonant cavity 8 in the second path. Because phases of two path signals are opposite to each other, and the two path signals cancel each other, low-end zero-point suppression of a passband can be generated.

Similarly, in this embodiment, a purpose of adjusting a low-end zero-point position of the dielectric filter may be alternatively achieved by adjusting a diameter of the via hole 6 and a width of the first partition ring 7.

In addition, a shape of the via hole 6 of the dielectric filter in this embodiment of this application may be designed based on an actual requirement. For example, the via hole 6 may be designed to be a circular via hole 6 or a polygonal via hole 6. When the via hole 6 is designed to be the circular via hole 6, a processing operation is easier. When the via hole 6 is designed to be the polygonal via hole 6, the polygonal via hole 6 may be, for example, various possible polygonal via holes 6 such as a triangular via hole 6, a rectangular via hole 6, a pentagonal via hole 6, and a hexagonal via hole 6.

In the dielectric filter shown in FIG. 9, the first partition ring 7 is disposed on an opening side of the via hole 6. In an optional embodiment, the first partition ring 7 may be disposed on each of two opening sides of the via hole 6.

Further, the dielectric filter in this embodiment of this application may be applied to a transceiver device, for example, may be applied to a base station. To be connected to a circuit structure of the transceiver device, the dielectric filter shown in FIG. 9 is further provided with a signal input end and a signal output end. A manner in which the signal input end and the signal output end are disposed on the dielectric filter is the same as that in the foregoing embodiments, and details are not described herein again.

Figure 12:
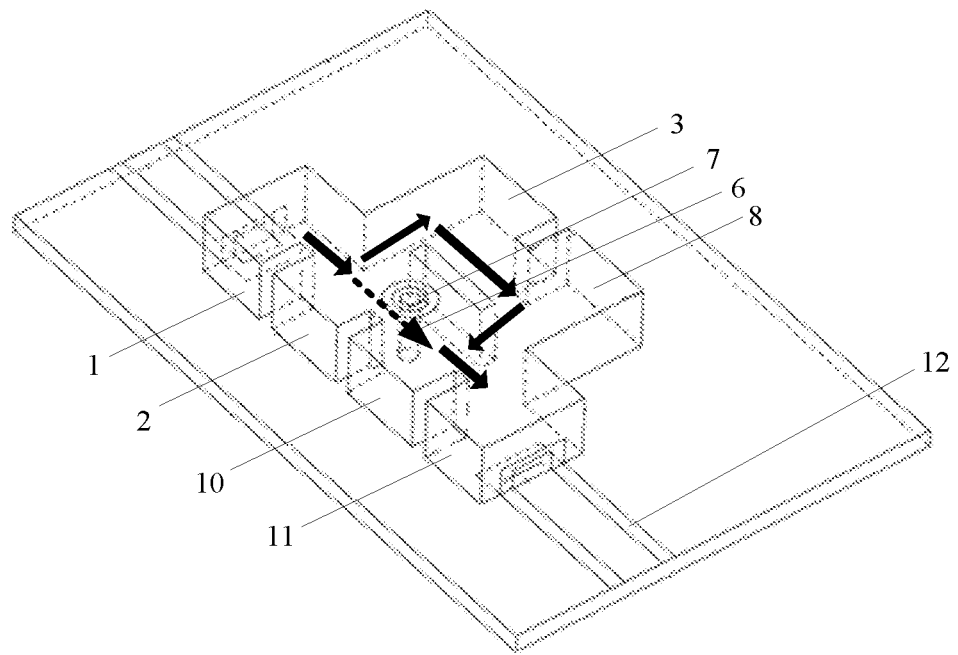
FIG. 12 is a schematic structural diagram of yet another dielectric filter according to an embodiment of this application.

FIG. 12 is a schematic structural diagram of yet another dielectric filter according to an embodiment of this application. As shown in FIG. 12, the dielectric filter includes a dielectric block whose surface is covered with a metal layer. In FIG. 12, the metal layer covering the surface of the dielectric block is not identified. For a structure shown in FIG. 12, except a particularly specified part, each surface of the structure shown in FIG. 12 is covered with the metal layer. During the following description of the structure in FIG. 12, only a part covered with no metal layer is particularly described.

The dielectric block shown in FIG. 12 is provided with slots, and the dielectric block is divided into a plurality of resonant cavities through the slots. As shown in FIG. 12, the dielectric block is provided with four first slots 4 and one second slot 5, and the dielectric block is divided into a first resonant cavity 1, a second resonant cavity 2, a third resonant cavity 3, a fourth resonant cavity 8, a fifth resonant cavity 10, and a sixth resonant cavity 11 through the four first slots 4 and the second slot 5.

When a signal is input from the first resonant cavity 1 of the dielectric filter shown in FIG. 12 and output from the sixth resonant cavity 11 of the dielectric filter, two signal paths are formed on the dielectric filter shown in FIG. 12, as shown in FIG. 12, including the following:

a first path (marked by using a solid line): a signal path subsequently passing through the first resonant cavity 1, the second resonant cavity 2, the third resonant cavity 3, the fourth resonant cavity 8, the fifth resonant cavity 10, and the sixth resonant cavity 11; and a second path (marked by using a dashed line): a signal path subsequently passing through the first resonant cavity 1, the second resonant cavity 2, the fifth resonant cavity 10, and the sixth resonant cavity 11.

In the first path, inductive coupling is formed between adjacent resonant cavities based on an open window structure. When coupling between the second resonant cavity 2 and the fifth resonant cavity 10 in the second path is inductive coupling, phases of two path signals are the same, and no zero-point is generated due to in-phase signal superposition. When coupling between the second resonant cavity 2 and the fifth resonant cavity 10 in the second path is capacitive coupling, phases of two path signals are opposite to each other, the two path signals cancel each other, and a zero-point can be generated.

To form capacitive coupling between the second resonant cavity 2 and the fifth resonant cavity 10 in the second path, as shown in FIG. 12, a via hole 6 is disposed between the second resonant cavity 2 and the fifth resonant cavity 10, an inner wall of the via hole 6 is covered with a metal layer, a first partition ring 7 is disposed on a surface of the dielectric block and is surrounding at least one opening of the via hole 6, and the dielectric block is exposed in an area enclosed by an inner edge of the first partition ring 7 and an outer edge of the first partition ring 7. Optionally, the inner edge of the first partition ring 7 and an edge of the corresponding via hole 6 are disposed at intervals.

In the solution of this embodiment of this application, capacitive coupling is formed between the first resonant cavity 1 and the fourth resonant cavity 8 through a combined structure of the via hole 6 and the partition ring. An equivalent circuit is a capacitor element.

Figure 13:
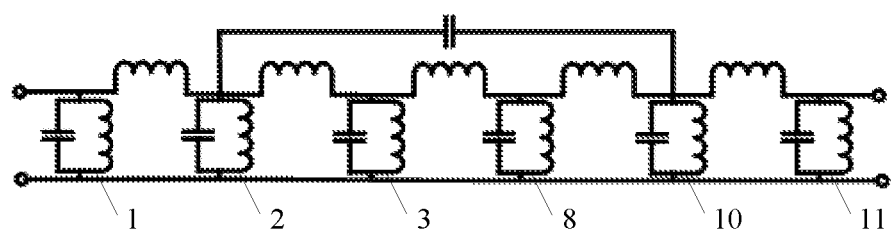
FIG. 13 is an equivalent circuit diagram of the dielectric filter shown in FIG. 12.

As shown in FIG. 13, an equivalent circuit of the dielectric filter shown in FIG. 12 has the following characteristic: Inductive coupling is formed between the first resonant cavity 1, the second resonant cavity 2, the third resonant cavity 3, the fourth resonant cavity 8, the fifth resonant cavity 10, and the sixth resonant cavity 11 in the first path; and capacitive coupling is formed between the second resonant cavity 2 and the fifth resonant cavity 10 in the second path. Because phases of two path signals are opposite to each other, and the two path signals cancel each other, low-end zero-point suppression of a passband can be generated.

Similarly, in this embodiment, a purpose of adjusting a low-end zero-point position of the dielectric filter may be alternatively achieved by adjusting a diameter of the via hole 6 and a width of the first partition ring 7.

In addition, a shape of the via hole 6 of the dielectric filter in this embodiment of this application may be designed based on an actual requirement. For example, the via hole 6 may be designed to be a circular via hole 6 or a polygonal via hole 6. When the via hole 6 is designed to be the circular via hole 6, a processing operation is easier. When the via hole 6 is designed to be the polygonal via hole 6, the polygonal via hole 6 may be, for example, various possible polygonal via holes 6 such as a triangular via hole 6, a rectangular via hole 6, a pentagonal via hole 6, and a hexagonal via hole 6.

In the dielectric filter shown in FIG. 12, the first partition ring 7 is disposed on an opening side of the via hole 6. In an optional embodiment, the first partition ring 7 may be disposed on each of two opening sides of the via hole 6.

Further, the dielectric filter in this embodiment of this application may be applied to a transceiver device, for example, a duplexer and a radio frequency signal filter. To be connected to a circuit structure of the transceiver device, the dielectric filter shown in FIG. 12 is further provided with a signal input end and a signal output end. A manner in which the signal input end and the signal output end are disposed on the dielectric filter is the same as that in the foregoing embodiments, and details are not described herein again. As shown in FIG. 12, the signal input end and the signal output end on the dielectric filter may be disposed on a circuit board through a microstrip feeder 12 and connected to other components through the microstrip feeder 12.

Figure 14:
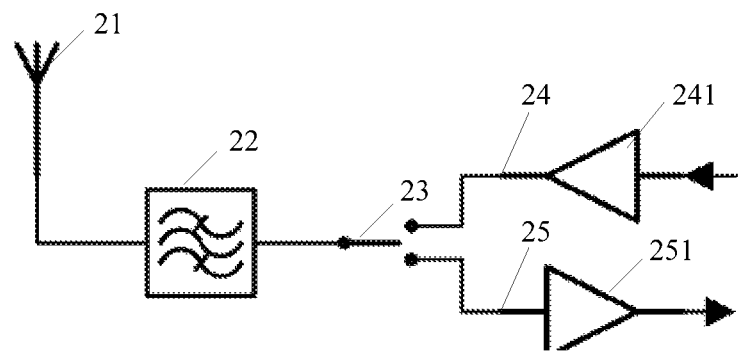
FIG. 14 is a schematic structural diagram of a transceiver device according to an embodiment of this application.

The embodiments of this application further provide a transceiver device, and the transceiver device includes any dielectric filter provided in the embodiments of this application. Optionally, FIG. 14 is a possible structural diagram of a transceiver device. The transceiver device includes a dielectric filter 22, an antenna 21, a switch 23, a signal receiving branch 25, and a signal transmitting branch 24; the antenna 21, the dielectric filter 22, and a control end of the switch 23 are sequentially connected; and two option ends of the switch 23 are connected to the signal receiving branch 25 and the signal transmitting branch 24, respectively. Specifically, a power amplifier 241 may be disposed on the signal transmitting branch 24, and a low noise amplifier 251 may be disposed on the signal receiving branch 25.

The embodiments of this application further provide a base station. The base station includes the transceiver device provided in the embodiments of this application. The base station described in this application may include network-side devices in various forms for wireless communication with user equipment, such as a macro base station, a micro base station, a relay station, an access point, or a remote radio unit (remote radio unit, RRU). This is not uniquely limited in this application. In systems using different radio access technologies, names of devices having a base station function may be different. For example, in an LTE network, the device is referred to as an evolved NodeB (evolved NodeB, eNB or eNodeB). In a 3G (the 3rd Generation, 3rd Generation) network, the device is referred to as a NodeB (NodeB).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A dielectric filter, the dielectric filter comprising a dielectric block whose surface is covered with a metal layer, wherein the dielectric block comprises at least two resonant cavities, wherein the dielectric block further comprises at least two slots, and wherein the dielectric block is divided into the at least two resonant cavities by the at least two slots;
   wherein the dielectric block is provided with a via hole, wherein the via hole is located between two adjacent resonant cavities, wherein the via hole is further located between two slots of the at least two slots, and wherein an inner wall of the via hole is covered with a metal layer; and
   wherein a first partition ring is disposed on the surface of the dielectric block and is surrounding at least one opening of the via hole, and wherein the dielectric block is exposed in an area enclosed by an inner edge of the first partition ring and an outer edge of the first partition ring, wherein the first partition ring and the via hole form a structure that is equivalent to a capacitor, the inner edge of the first partition ring and an edge of the opening of the via hole are disposed at interval, and a capacitive coupling strength of the dielectric filter is associated with a size of the interval.

2. The dielectric filter according to claim 1, wherein an inner surface of each slot is covered with the metal layer, and wherein each resonant cavity is configured to be equivalent to a parallel circuit formed by an inductor and a capacitor.

3. The dielectric filter according to claim 1, wherein the inner edge of the first partition ring and an edge of an opening of the via hole are disposed at intervals.

4. The dielectric filter according to claim 1, wherein a center line of the first partition ring coincides with an axis of the via hole.

5. The dielectric filter according to claim 1, wherein the first partition ring is disposed on each of two opening sides of the via hole.

6. The dielectric filter according to claim 1, wherein the via hole is a circular via hole.

7. The dielectric filter according to claim 1, wherein the via hole is a polygonal via hole.

8. The dielectric filter according to claim 1, wherein the dielectric block is further provided with a second partition ring;
   wherein the dielectric block is exposed between an inner edge and an outer edge of the second partition ring; and
   wherein the metal layer in an area enclosed by the inner edge of the second partition ring serves as a signal input end or a signal output end.

9. The dielectric filter according to claim 1, wherein the first partition ring is disposed on a planar surface.

10. A transceiver device, the transceiver device comprising a dielectric filter, wherein the dielectric filter comprises a dielectric block whose surface is covered with a metal layer, wherein the dielectric block comprises at least two resonant cavities, wherein the dielectric block further comprises at least two slots, and wherein the dielectric block is divided into the at least two resonant cavities by the at least two slots;
    wherein the dielectric block is provided with a via hole, wherein the via hole is located between two adjacent resonant cavities, wherein the via hole is further located between two slots of the at least two slots, and wherein an inner wall of the via hole is covered with a metal layer; and
    wherein a first partition ring is disposed on the surface of the dielectric block and is surrounding at least one opening of the via hole, and wherein the dielectric block is exposed in an area enclosed by an inner edge of the first partition ring and an outer edge of the first partition ring, wherein the first partition ring and the via hole form a structure that is equivalent to a capacitor, the inner edge of the first partition ring and an edge of the opening of the via hole are disposed at interval, and a capacitive coupling strength of the dielectric filter is associated with a size of the interval.

11. The transceiver device according to claim 10, wherein an inner surface of each slot is covered with the metal layer, and wherein each resonant cavity is configured to be equivalent to a parallel circuit formed by an inductor and a capacitor.

12. The transceiver device according to claim 10, wherein the inner edge of the first partition ring and an edge of an opening of the via hole are disposed at intervals.

13. The transceiver device according to claim 10, wherein a center line of the first partition ring coincides with an axis of the via hole.

14. The transceiver device according to claim 10, wherein the first partition ring is disposed on each of two opening sides of the via hole.

15. The transceiver device according to claim 10, wherein the via hole is a circular via hole.

16. The transceiver device according to claim 10, wherein the via hole is a polygonal via hole.

17. The transceiver device according to claim 10, wherein the dielectric block is further provided with a second partition ring;

wherein the dielectric block is exposed between an inner edge and an outer edge of the second partition ring; and wherein the metal layer in an area enclosed by the inner edge of the second partition ring serves as a signal input end or a signal output end.

18. A base station, the base station comprising a transceiver device, the transceiver device comprising a dielectric filter, wherein the dielectric filter comprises a dielectric block whose surface is covered with a metal layer, and wherein the dielectric block comprises at least two resonant cavities, wherein the dielectric block further comprises at least two slots, and wherein the dielectric block is divided into the at least two resonant cavities by the at least two slots;

wherein the dielectric block is provided with a via hole, wherein the via hole is located between two adjacent resonant cavities, wherein the via hole is further located between two slots of the at least two slots, and wherein an inner wall of the via hole is covered with a metal layer; and wherein a first partition ring is disposed on the surface of the dielectric block and is surrounding at least one opening of the via hole, and wherein the dielectric block is exposed in an area enclosed by an inner edge of the first partition ring and an outer edge of the first partition ring, wherein the first partition ring and the via hole form a structure that is equivalent to a capacitor, the inner edge of the first partition ring and an edge of the opening of the via hole are disposed at interval, and a capacitive coupling strength of the dielectric filter is associated with a size of the interval.

19. The base station according to claim 18, wherein an inner surface of each slot is covered with the metal layer.

20. The base station according to claim 18, wherein the inner edge of the first partition ring and an edge of an opening of the via hole are disposed at intervals.

21. The base station according to claim 18, wherein a center line of the first partition ring coincides with an axis of the via hole.

* * * * *